Nov. 12, 1929.   L. WERNICKE   1,735,822
AIR MOTOR
Filed Jan. 9, 1928   4 Sheets-Sheet 1

Louis Wernicke
INVENTOR
BY Victor J. Evans
ATTORNEY

Nov. 12, 1929.  L. WERNICKE  1,735,822
AIR MOTOR
Filed Jan. 9, 1928    4 Sheets-Sheet 4

Louis Wernicke
INVENTOR
BY Victor J. Evans
ATTORNEY

Patented Nov. 12, 1929

1,735,822

UNITED STATES PATENT OFFICE

LOUIS WERNICKE, OF WEST BEND, WISCONSIN

AIR MOTOR

Application filed January 9, 1928. Serial No. 245,450.

This invention relates to improvements in air motors of the type covered by my Patent No. 1,628,867, patented May 17, 1927, the principal objects of the present invention being to improve the construction of the air motor and to provide starting and stopping means for the same and also to provide governor means for controlling the speed of the motor.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
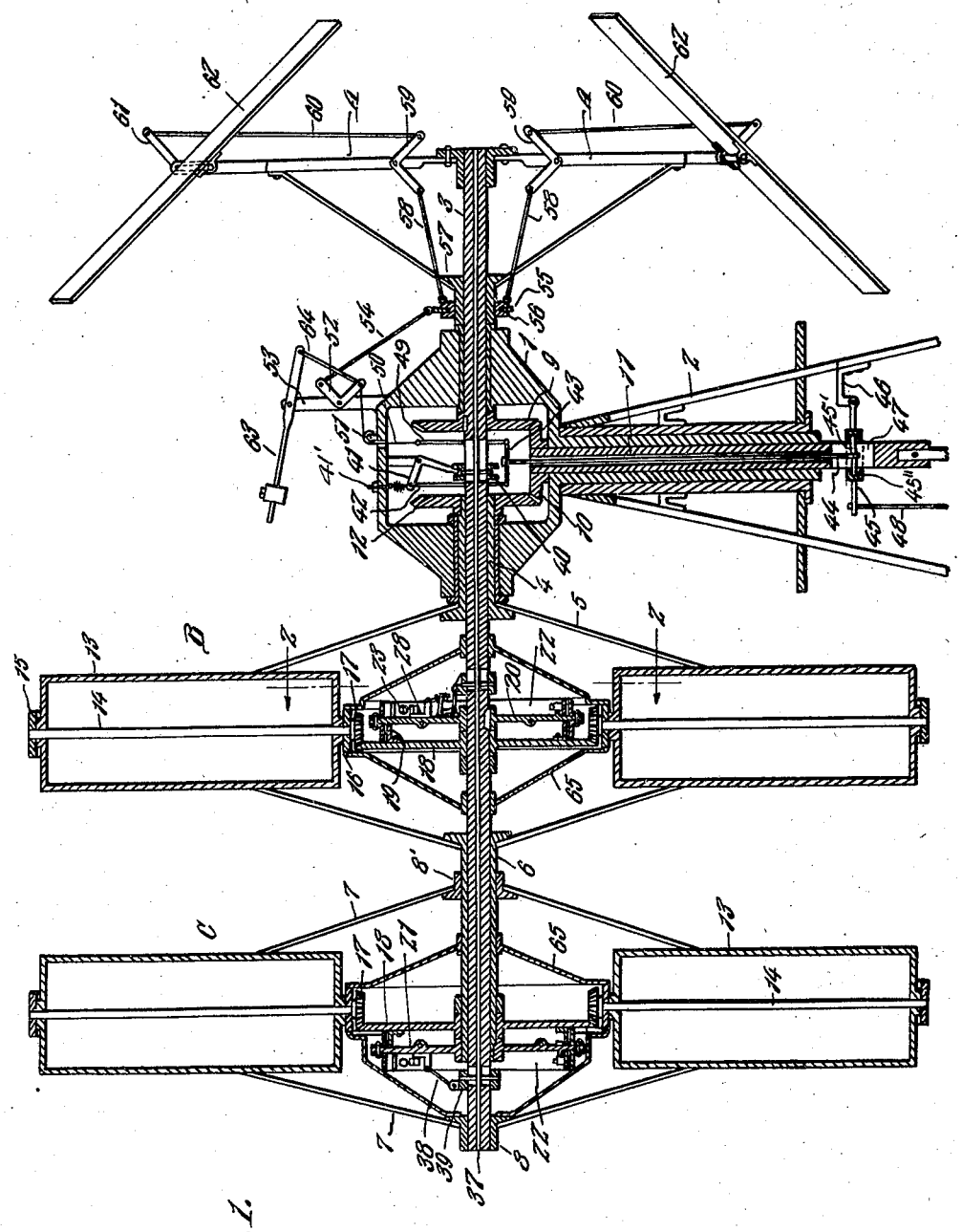
Figure 1 is a sectional view through the improved motor.
Figure 2:
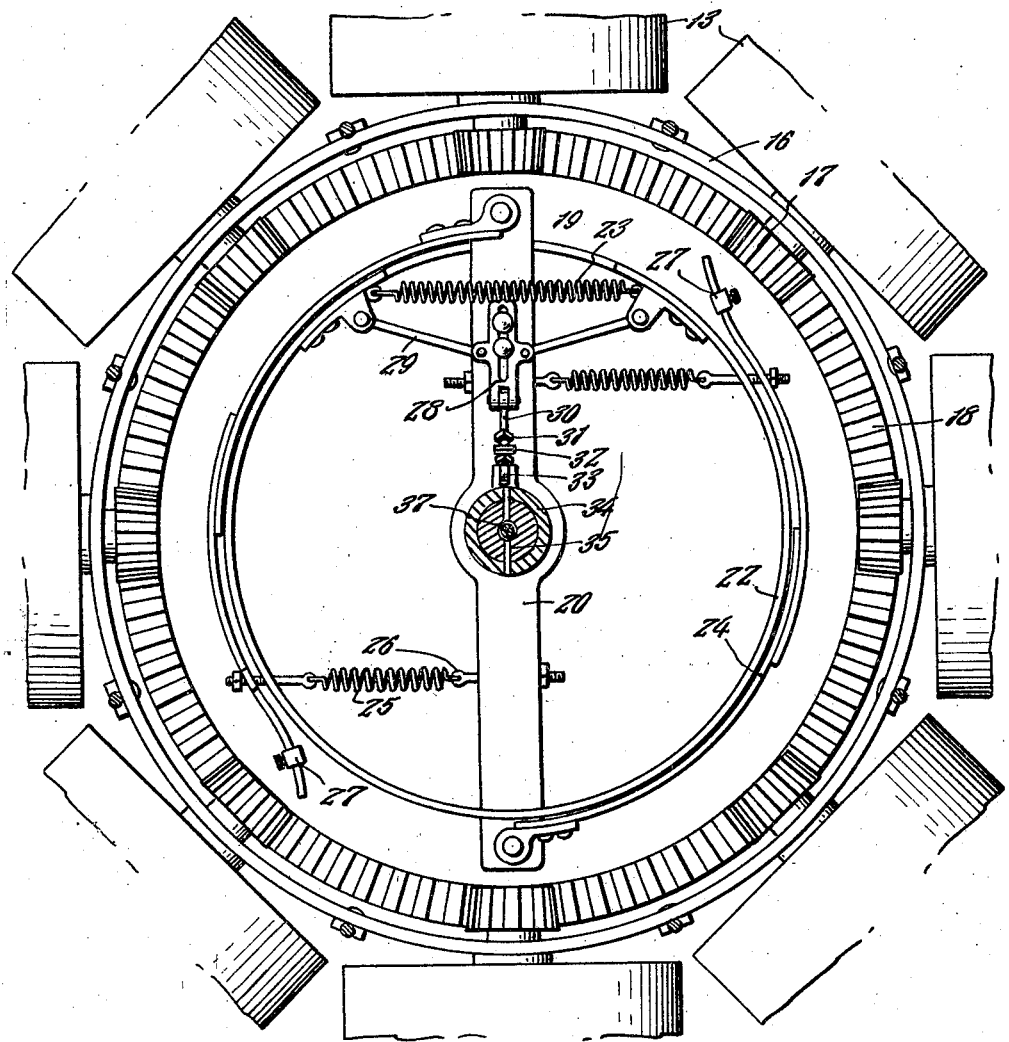
Figure 2 is a section on line 2—2 of Figure 1.
Figure 3:
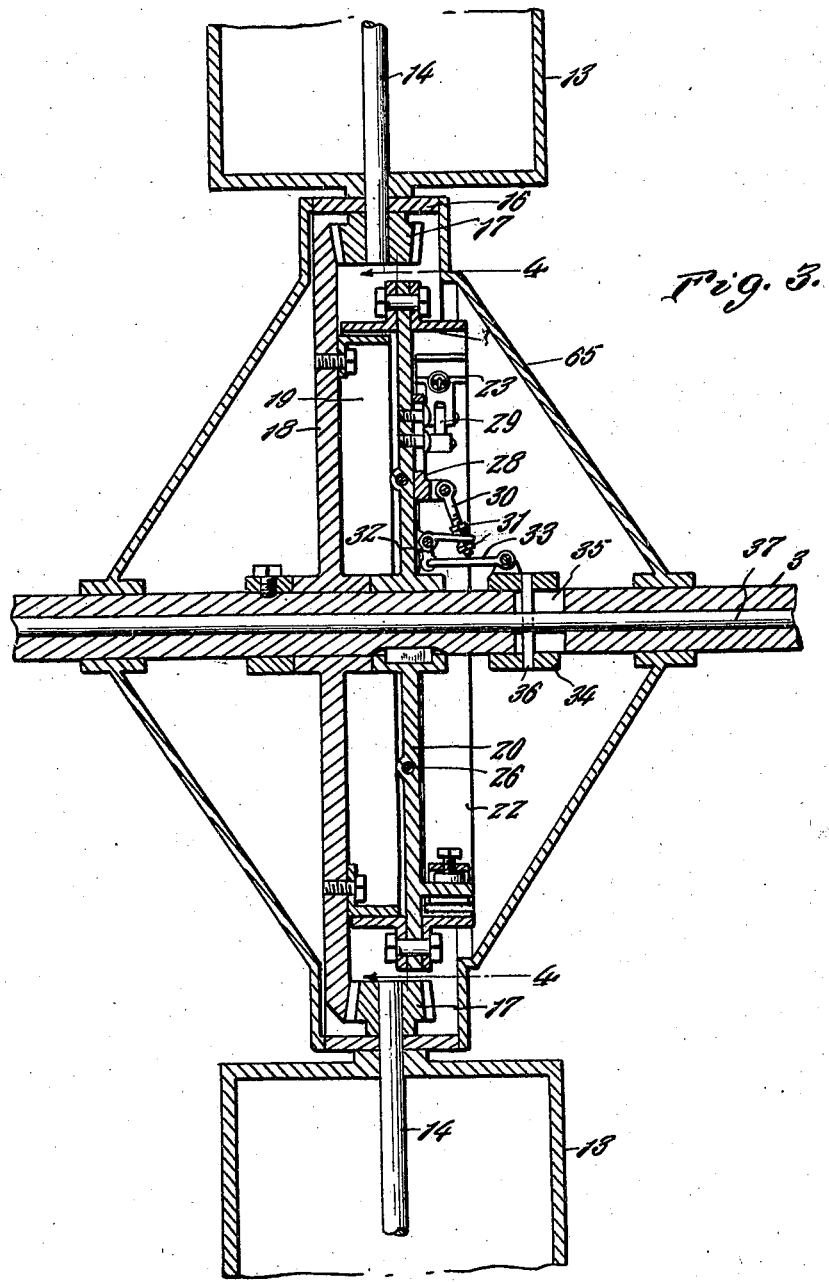
Figure 3 is an enlarged sectional view showing the central portion of the inner cylinder carrying wheel and its associated parts.
Figure 4:
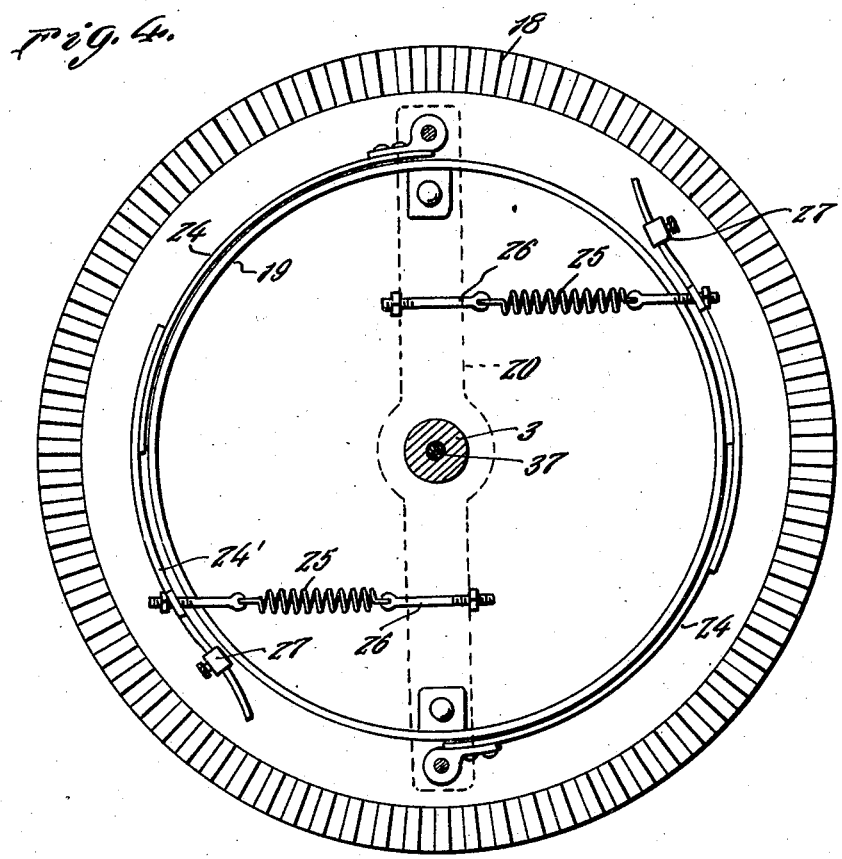
Figure 4 is a section on line 4—4 of Figure 3.

In these drawings, 1 indicates the housing which is rotatably mounted in the tower 2 and 3 indicates the main shaft which passes through the housing and is journaled therein and to which is connected, at one end thereof, the main wind wheel A. A sleeve 4 is journaled in the rear part of the housing and surrounds a portion of the shaft on which it rotates and a wheel B has its spokes 5 connected with the outer end of said sleeve so that the wheel will rotate with the sleeve. The other set of spokes of this wheel B are connected to a hollow shaft 6 which is rotatably mounted on the rear part of the shaft 3. The wheel C has one set of its spokes 7 connected to a hub 8 which is fastened to the rear end of the shaft and the other set of spokes is connected to a hub 8' which is rotatably mounted on the hollow shaft 6.

A bevel gear 9 is keyed to the shaft 3 and is arranged in the housing 1 and this gear meshes with a gear 10 connected with the upper end of the vertically arranged driven shaft 11 journaled in the tower and this gear 10 is also arranged in the housing. Gear 10 meshes with a bevel gear 12 arranged in the housing and is keyed to the inner end of the sleeve 4 so that the sleeve is rotated from the wheel A and in an opposite direction to the direction of rotation of the shaft 3. Thus wheel B is rotated in an anti-clockwise direction, wheel C rotating in a clockwise direction or in the same direction as wheel A.

Each of the wheels B and C carries a plurality of radially arranged cylinders 13, each cylinder being fastened to a shaft 14 which passes through the center of the cylinder and has its ends journaled in the outer ring 15 and the inner ring 16 of the wheel. The inner end of each shaft 14 has fastened thereto a bevel pinion 17 which meshes with a large gear 18, the gear 18 of wheel B being rotatably arranged on the shaft 3 and that of the wheel C being rotatably arranged on the hollow shaft 6. Each gear 18 has fastened thereto a drum forming flange 19.

A standard 20 has its central part formed with a hub which is rigidly mounted on the shaft 3, this standard being arranged adjacent the gear 18 of wheel B and a similar standard 21 is arranged adjacent the gear 18 of wheel C, this standard 21 being rigidly arranged on the hollow shaft 6. Each standard carries an expansible band 22 of split ring type with its ends connected together by a coil spring 23 which normally holds the band contracted. Each standard also carries a pair of clutch members 24, one of which is pivoted to each end of the standard and these clutch members 24 are wide enough to extend over the drum 19 and over the band 22. Coil springs 25 are adjustably connected with the standard and with extensions 24' of the members 24 by the bolts 26, these springs normally holding the clutch members in engagement with the drum 19 so that the gear 18 will be frictionally connected with the standard and thus caused to rotate with the standard. However, when the band 22 is expanded, it will force the clutch members outwardly out of engagement with the drum so that the gear 18 will not rotate with the standard.

Each extension 24' is provided with an adjustable weight 27 which acts, through centrifugal force, to move the clutch members outwardly, when the wheels B and C are revolving at a certain speed and thus act to release the gear 18 from the standard and thus check the movement of each wheel, these parts acting as governor means for preventing each wheel from revolving too fast.

A slide 28 is arranged on each standard and this slide is connected by the links 29 with the ends of the band 22 so that when the slide is moved outwardly, the band is expanded against the action of its spring and will thus move the clutch members 24 outwardly out of engagement with the drum 19. The slide associated with a standard of wheel B is adjustably connected by the bolt 30 and its nuts 31 with one arm of a bell crank 32 carried by the standard, and a link 33 connects the other end of the bell crank with a collar 34 slidably mounted on the shaft 3 over a slot 35 in said shaft and said collar is fastened by a pin 36 to a rod 37 which passes through a hole formed in the center of the shaft 3. The slide which is associated with the standard of wheel C is connected by a link 38 with a collar 39 slidably mounted on the shaft and fastened by a pin to the rod 37. A grooved collar 40 is pinned to the rod and is slidably arranged on the shaft 3 within the housing 1, this collar being shifted back and forth by the movement of a bell crank 41 arranged within the housing and pivoted to a hanger carried by said housing. A link 42 connects the bell crank 41 with a cross piece 43 in the housing, the center part of the cross piece being connected to a pull rod 44 which passes through a centrally arranged hole in the shaft 11, with its lower end connected to a lever 45 by a pin 45' which engages a groove in a ring-shaped part of the lever so that the pin can rotate with the shaft. The lever is pivoted to a bracket 46 on the tower. The pin 45' is located in a slot 47 in said shaft 11. A member 48 depends from the lever so that the lever can be operated from the lower part of the tower.

Figure 5:
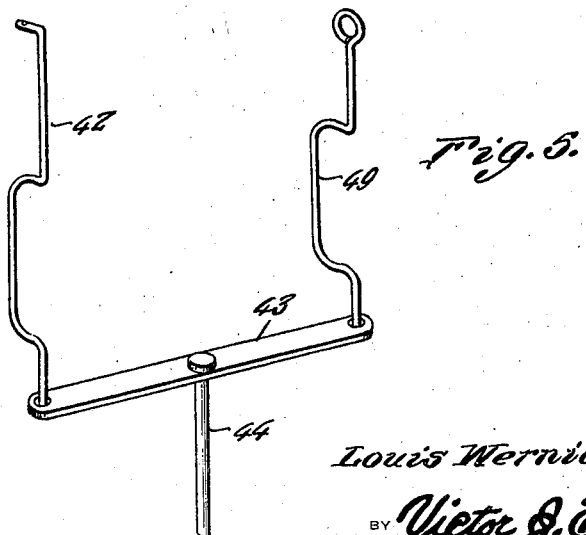
Figure 5 is a view of the parts which are connected with the pull rod for operating the bell crank for moving the rod in the shaft and the cable which operates the bell crank which controls the opening and closing movement of the main wheel.

A second link 49 is connected with the cross piece 43, the links 42 and 49 having offset portions for passing around the shaft 3, as clearly shown in Figure 5. A cable 50 is connected with the upper end of the link 49 and passes through a hole in the top of the housing 1 and over a pulley 51 on the top of the housing and is connected to a bell crank 52 pivoted to a standard 53 on the housing. A link 54 connects the bell crank 52 with a ring 55 arranged in the groove of a collar 56 which is slidably mounted on a hub part 57 of the wheel A. Links 58 connect the collar 56 with the bell cranks 59 carried by the wheel A, these bell cranks being connected by the links 60 with the crank shafts 61 of the wheel, these crank shafts carrying the vanes 62 of the wheel. A weighted lever 63 is pivoted to the standard 53 and is connected with the lower arm of the bell crank 52 by the link 64.

A housing 65 surrounds the gear 18 and its clutch parts of each wheel, each housing revolving with the wheel, by being connected with the inner ring of each wheel, the central portion of the housing of wheel B rotating on the shaft while that of the housing of wheel C revolves on the hollow shaft, the outer end of this housing being connected with the hub 8.

From the foregoing it will be seen that when the wind wheel is rotating, the shaft 3 which is connected with wheel C will cause said wheel C to rotate in the same direction as the wind wheel, but wheel B will rotate in an opposite direction as it is connected with the sleeve 4 which is geared to the shaft. The standard 20 of wheel B is keyed to the shaft and will rotate with said shaft, but the standard of wheel C is keyed to the hollow shaft 6 which rotates with wheel B so that said standard of wheel C will rotate in the same direction as wheel B, but in an opposite direction from wheel C, while the standard of wheel B will rotate in an opposite direction from that of wheel B. As the clutch members are in engagement with the drums of the gears 18, said gears must revolve with the standards, and as the gear 18 of wheel B is revolving in an opposite direction from wheel B, the shafts 14 and their cylinders 13 will be rotated through the engagement of the pinions 17 with the gear 18. The gear 18 of wheel C is also connected with its standard by the clutch means so that this gear, meshing with the pinions of the cylinders, will rotate said cylinders, but these cylinders of wheel C will be rotating in an opposite direction from the cylinders of wheel B.

The effect of wind striking the rotating cylinders is an increase of pressure with a decrease of wind velocity, on the side on which the wind strikes, and a decrease of pressure with an increase of velocity of the opposite side. By the application of the "Magnus law", the area of decreased pressure and increased velocity will, at certain cylinder speed, extend approximately three-fourths of the way around the cylinders. It has been found that this effect is attained when the cylinders are rotated at about four times the wind velocity, and the developed pressure will then be about fifteen times greater than ordinarily.

Thus the wheels B and C will act with wheel A in driving the shaft 11. If the speed of rotation exceeds a point for which the governors are set, the weighted parts will swing outwardly under centrifugal action, thus lifting the clutch members off the drums 19 of the gears 18 and thus the movement of the cylinders will be checked and the whole apparatus slowed up until the speed lessens sufficiently to permit the springs to return the clutch parts against the drums, which will cause the drums to be rotated again.

When the device is to be stopped, the pull rod 44 is pulled downwardly by means of the lever 45 and its connections, so that the cross piece 43 will be lowered, exerting a pull upon the links 42 and 49, which will swing the bell crank lever 52 downwardly and the weighted lever 63 upwardly. The link 54 will push the collar 56 forwardly, thus rocking the links 59 and turning the crank shaft 61 through the links 60 to move the vanes to an inoperative position so that the wind will not act to rotate said wheel A. At the same time, the link 42 will move the bell crank 41 to shift the collar 40 and thus move the rod 37 forwardly and as the collars 34 and 39 are connected to this rod, said collars will move with the rod and this movement, through the connections before described, will expand the bands 22 so as to push the clutch members off the drums of the gears 18 and thus disconnect the gears from the standards and thus the cylinders will cease to operate.

A spring 41', connected with the bell crank 41 and adjustably connected with the top of the housing 1, is provided for moving the parts to a position to relieve the expansion members when the pull rod 44 is released, thus preventing the members 30, 31 and 38 from locking the clutch parts in operative position.

As will be understood, the wind wheel simply acts as a starter for the cyclinder carrying wheels, though I provide means whereby said wind wheel will help the cylinder carrying wheels to operate the power transmitting shaft and the load when the device is in operation, though said cylinder carrying wheels will be operated by the wind even though the wind wheel is in inoperative position.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. A device of the character described comprising a main shaft, means for rotating the same, a pair of wheels on said shaft, means for revolving said wheels in opposite directions, a plurality of radially arranged cylinders rotatably mounted in each wheel, means for rotating the cylinders of one wheel from the shaft and means for rotating the cylinders of the second wheel by the first wheel.

2. A device of the character described comprising a main shaft, a wind wheel for rotating the same, a pair of wheels on said shaft, means for revolving said wheels in opposite directions from the shaft, a plurality of radially arranged cylinders rotatably mounted in each wheel, means for rotating the cylinders of one wheel from the shaft, and means for rotating the cylinders of the second wheel by the first wheel.

3. A device of the character described comprising a main shaft, a wind wheel for rotating the same, a pair of wheels on said shaft, means for revolving said wheels in opposite directions, a plurality of radially arranged cylinders rotatably mounted in each wheel, means for rotating the cylinders of one wheel from the shaft, means for rotating the cylinders of the second wheel by the first wheel, manually operated means for moving the parts of the wind wheel into inoperative position, and means connected with the manually operated means for disconnecting the cylinders of each wheel from the driving means.

4. A device of the character described comprising a main shaft, a wind wheel for rotating the same, a pair of wheels on said shaft, means for revolving said wheels in opposite directions, a plurality of radially arranged cylinders rotatably mounted in each wheel, means for rotating the cylinders of one wheel from the shaft, means for rotating the cylinders of the second wheel by the first wheel, manually operated means for moving the parts of the wind wheel into inoperative position, means connected with the manually operated means for disconnecting the cylinders of each wheel from the driving means, and governor means for throwing the driving means of the cylinders out of operation when the speed of rotation of the device reaches a certain degree.

5. A device of the character described comprising a main shaft, means for rotatably supporting the same, a wind wheel for rotating the shaft, a second wheel supported from the shaft and rotated from the wind wheel, a plurality of radially arranged cylinders carried by the second wheel, means for rotating the cylinders from the shaft, governor means for disconnecting the cylinders from the driving means when the speed of the device reaches a certain degree and manually operated means for disconnecting the cylinders from the driving means.

6. A device of the character described comprising a supporting member, a shaft rotatably supported thereby, a wind wheel connected with the shaft, a second wheel rotating with the shaft, a third wheel rotatably mounted on the shaft, gears for driving the third wheel from the shaft in a direction opposite to that of the other wheels, a plurality of radially arranged cylinders carried by each of the second and third wheels, means for rotating the cylinders of the third wheel from the shaft, means for rotating the cylinders of the second wheel from the third wheel, a driven shaft and means for rotating the same from the shaft and from the third wheel.

7. A device of the character described comprising a supporting member, a shaft rotatably supported thereby, a wind wheel connected with the shaft, a second wheel rotating with the shaft, a third wheel rotatably mounted on the shaft, gears for driving the third wheel from the shaft in a direction opposite to that of the other wheels, a plurality of radially arranged cylinders carried by each of the second and third wheels, means for rotating the cylinders of the third wheel from the shafts, means for rotating the cylinders of the second wheel from the third wheel, a driven shaft, means for rotating the same from the shaft and from the third wheel, and governor means for controlling the speed of the cylinders.

8. A device of the character described comprising a supporting member, a shaft rotatably supported thereby, a wind wheel connected with the shaft, a second wheel rotating with the shaft, a third wheel rotatably mounted on the shaft, gears for driving the third wheel from the shaft in a direction opposite to that of the other wheels, a plurality of radially arranged cylinders carried by each of the second and third wheels, means for rotating the cylinders of the third wheel from the shaft, means for rotating the cylinders of the second wheel from the third wheel, a driven shaft, means for rotating the same from the shaft and from the third wheel, governor means for controlling the speed of the cylinders, and manually operated means for releasing the cylinders from their driving means and for moving the parts of the wind wheel into inoperative position.

9. A device of the class described comprising supporting means, a shaft rotatably supported thereby, a wheel on the shaft, a plurality of radially arranged cylinders carried by the wheel, a gear loosely carried by the shaft, gears carried by the cylinders and meshing with the said gear and manually operated clutch means for connecting the gear with the shaft for causing the rotary movement of the cylinders to be transmitted to the shaft.

10. A device of the class described comprising supporting means, a shaft rotatably supported thereby, a wheel on the shaft, a plurality of radially arranged cylinders carried by the wheel, a gear loosely carried by the shaft, gears carried by the cylinders and meshing with the said gear, manually operated clutch means for connecting the gear with the shaft for causing the rotary movement of the cylinders to be transmitted to the shaft, and governor means for disconnecting the clutch means from the gear when the speed of the parts reaches a certain degree.

In testimony whereof I affix my signature.

LOUIS WERNICKE.